United States Patent [19]

Spamer

[11] Patent Number: 5,024,336
[45] Date of Patent: * Jun. 18, 1991

[54] COMPOSITE ORGANIZER

[75] Inventor: William S. Spamer, Roswell, Ga.

[73] Assignee: The Mead Corporation, Dayton, Ohio

[*] Notice: The portion of the term of this patent subsequent to Sep. 25, 2007 has been disclaimed.

[21] Appl. No.: 557,523

[22] Filed: Jul. 24, 1990

[51] Int. Cl.⁵ .................................................. A47F 7/00
[52] U.S. Cl. .................................... 211/59.2; 211/153; 211/189
[58] Field of Search ..................... 211/59.2, 175, 133, 211/153, 189

[56] References Cited

U.S. PATENT DOCUMENTS

| | | | |
|---|---|---|---|
| 4,331,243 | 5/1982 | Doll | 211/59.2 |
| 4,593,823 | 6/1986 | Fershko et al. | 211/133 X |
| 4,693,382 | 9/1987 | Galen | 211/189 |
| 4,785,943 | 11/1988 | Deffner et al. | 211/59.2 |
| 4,785,945 | 11/1988 | Rowse et al. | 211/59.2 |
| 4,958,739 | 9/1990 | Spamer | 211/153 |

Primary Examiner—Reinaldo P. Machado
Assistant Examiner—Sarah A. Lechok
Attorney, Agent, or Firm—Rodgers & Rodgers

[57] ABSTRACT

A composite structure for supporting and displaying articles includes a main rectangular planar element having front, rear and opposed side edges, an auxiliary rectangular planar element having front, rear and opposed side edges one edge of the auxiliary rectangular planar element being of a configuration which is irregular and complementary to one irregular edge of the main rectangular planar element to define a disjointable irregular junction between the units together with a reinforcing under structure integrally formed with the lower surfaces of the main and auxiliary units and including a plurality of spaced apart longitudinal reinforcing ribs each of the reinforcing ribs being severed at the disjointable irregular junction to accommodate separation of the units.

8 Claims, 2 Drawing Sheets

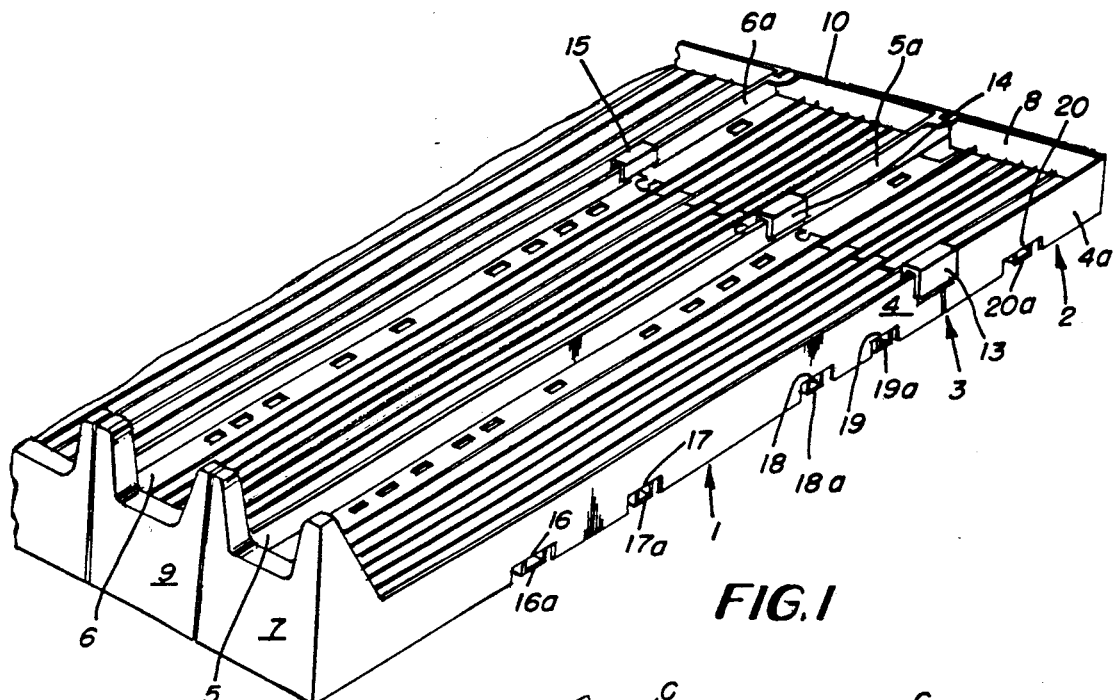
FIG.1
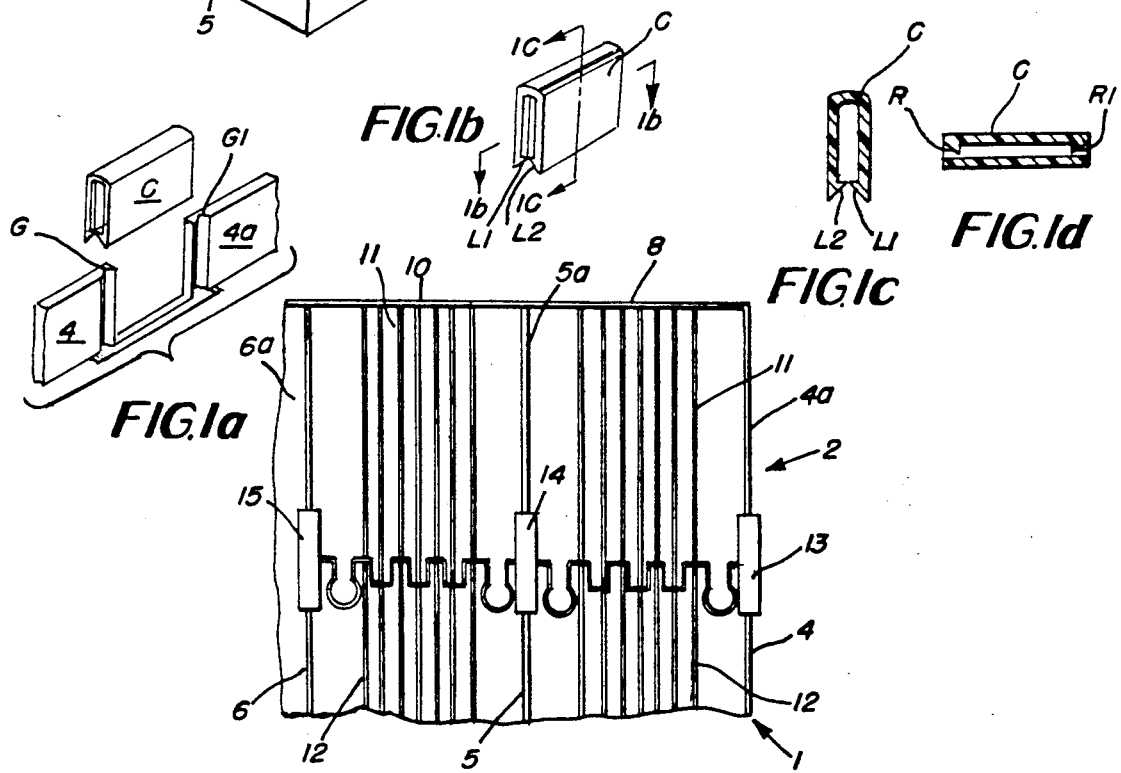

COMPOSITE ORGANIZER

TECHNICAL FIELD

This invention pertains to a composite structure for use as a level or gravity feed organizer and which includes disjointable main and auxiliary elements each including reinforcing under structure.

BACKGROUND ART

U. S. Pat. No. 4,690,287 issued Sept. 1, 1987 and owned by the assignee of this invention discloses a display device such as is used in refrigerators and supermarkets and the like and includes a main central portion together with side portions which are frangibly secured to the central portion so that removal of one or more frangible side portions effectively reduces the area and overall capacity of the display device so that it may fit various door widths.

U.S. Pat. No. 4,724,968 issued Feb. 16, 1988 discloses a display device wherein a composite structure is formed of interconnected elements.

U.S. Pat. No. 4,785,945 issued Nov. 22, 1988 discloses combinations of laterally interlocked modules.

U.S. Pat. 4,801,025 issued Jan. 31, 1989 discloses a shelf organizer unit having frangible side and rear portions.

U.S. patent application Ser. No. 391,424 filed Aug. 9, 1989 and owned by the assignee of this invention discloses a composite shelf organizing unit which is constructed of component parts which are disjointably connected and which are adapted for reassembly after disconnection.

U.S. Patent application Ser. No. 416,057 filed Oct. 2, 1989 and owned by the assignee of this invention discloses a composite shelf having a flat bottom surface and which includes main and auxiliary rectangular planar elements which are disjointably secured along one edge of each unit and which is constructed so as to provide a junction between the units which is free of obstruction.

SUMMARY OF THE INVENTION

According to this invention in one form, a composite organizer is provided which includes main and auxiliary rectangular planar elements each having front, rear and opposed side edges, one edge of said auxiliary element being of a configuration which is irregular and complementary to one irregular edge of said main rectangular element to define a disjointable irregular junction between said units, a reinforcing under structure integrally formed with the lower surfaces of said units and including a plurality of spaced apart longitudinal reinforcing ribs each of said longitudinal ribs being severed at said disjointable irregular junction to accommodate separation of the units. According to one feature of the invention, disjointable connecting means is arranged to disconnect and to reconnect said nuts.

BRIEF DESCRIPTION OF THE DRAWINGS

In the drawings FIG. 1 perspective view of an organizer device which incorporates this invention; FIG. 1a is an exploded perspective view of one form of connecting means for disconnecting reconnecting the main and auxiliary elements; FIG. 1b is a perspective view of a U-shaped clip such as is shown in FIG. 1a; FIG. 1c is a cross sectional view taken along the line designated 1c–1c in FIG. 1b; FIG. 1d is a cross sectional view taken along the line designated 1d–1d in FIG. 1b; FIG. 2 is an enlarged fragmentary plan view of a corner portion of the structure shown in FIG. 1.

BEST MODE OF CARRYING OUT THE INVENTION

Figure 3:
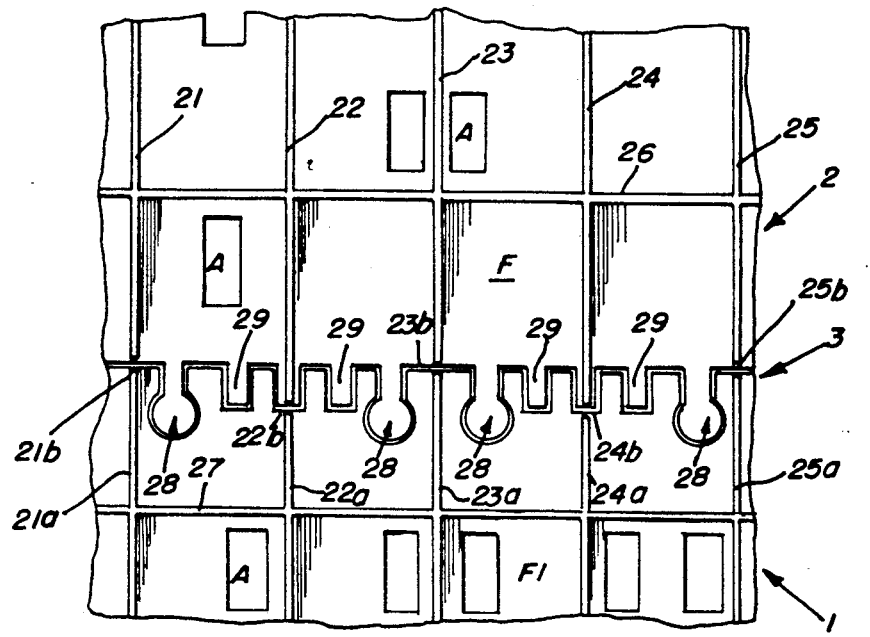
FIG. 3 is a plan view of a fragment of a composite organizer structure as viewed from below and which shows reinforcing under structure including longitudinal reinforcing ribs laterally spaced from each other.

In FIG. 1, the numeral 1 generally designates a main rectangular planar element and the numeral 2 generally designates an auxiliary rectangular planer element which is adjoined along its front edge to the rear edge of main planar element 1 at an irregular junction generally designated by the numeral 3. The numeral 4 designates a side guide while the numerals 5 and 6 designate intermediate guides of main planar element 1. The designation 4a identifies a side guide of auxiliary planar element 2. Intermediate guides of auxiliary planar element 2 are designated at 5a and 6a. The channel interposed between intermediate guides 4, 4a and 5 and 5a includes a front wall 7 and a rear wall 8. In like fashion, the channel defined between intermediate guides 5, 5a and 6, 6a includes a front wall 9 and a rear wall 10. Low friction ribs 11 are integrally formed atop the upper surface of auxiliary rectangular planar element 2 and low friction ribs 12 are integral with the upper surface of main rectangular planar element 1. Ribs 11 and 12 are well known in the art. Side guide 4 of main rectangular planar element 1 is disjointably connected with side guide 4a of auxiliary rectangular planar element 2 by means of a disjointable clip 13 which preferably is molded simultaneously with the molding of main planar element 1 and auxiliary planar element 2. In like fashion, the clip 14 interconnects intermediate guides 5 and 5a and disjointable clip 15 interconnects intermediate guides 6 and 6a. Clips 14 and 15 are formed in the same manner as is disjointable clip 13. Clips 13, 14 and 15 may be constructed according to clip C shown in FIGS. 1a–1d if desired.

According to one feature of this invention, the composite structure shown in FIG. 1 is arranged for mounting in spaced relation above a similar composite unit so as to provide a double tiered structure. Toward this end, suitable notches 16–20 are formed in the side guides 4 and 4a as shown schematically in FIG. 1. Similar notches are formed in downwardly extending parts of intermediate guides 5 and 6 to accommodate horizontally disposed support members 16a–20a which by any suitable means are mounted in spaced relationship above a composite structure disposed underneath in spaced relation to a structure such as is shown in FIG. 1. Suitable structure for supporting a pair of display units one above the other is fully disclosed in U.S. Pat. No. 4,690,287 issued Sept. 1, 1987 and owned by the assignee of this invention. It should be pointed out that other structural arrangements may be used if desired to provide support for two units one spaced above the other.

Figure 4:
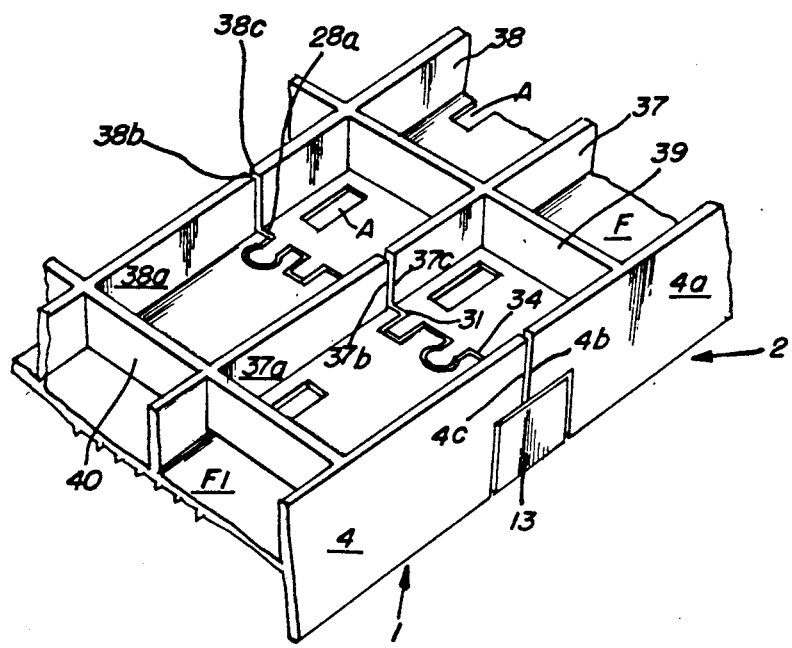
FIG. 4 is a perspective view somewhat similar to FIG. 3 but which shows under structure of an organizer unit wherein the longitudinal reinforcing ribs are spaced apart by different distances from the spacing of the ribs shown in FIG. 3.

Units such as that shown in FIG. 1 may be constructed of light weight material as a result of an advantage afforded by this invention two forms of which are illustrated in FIGS. 3 and 4 showing under structure which affords substantial reinforcement for the structure shown in FIG. 1.

With reference to FIG. 3, a plurality of longitudinal reinforcing ribs 21-25 formed integrally with the floor F of the auxiliary unit and longitudinal reinforcing ribs 21a-25a are formed integrally with the floor F1 of the main rectangular planar element 1. In addition to the longitudinal reinforcing ribs, transverse reinforcing rib 26 is formed integral with the floor F and with the ribs 21-25 as is obvious from FIG. 3. In similar fashion, a transverse reinforcing rib 27 is formed integrally with the floor F1 of main rectangular planar element 1 and with the longitudinal reinforcing ribs 21a-25a as is best shown in FIG. 3. As is well known, ventilating apertures such as are indicated at A may be formed if desired and constitute no part of this invention.

The irregular junction generally designated by the numeral 3 includes complementary keyholes formed in main element 1 and associated structure 28 formed along an edge of unit 2 and rectangular projections such as 29 formed integrally with unit 2. From FIG. 3 it is clear that the rib 21 is severed at 21b and that the ribs 22, 23, 24 and 25 are severed at 22b, 23b, 24b and 25b. Thus the transverse junction between main rectangular planar element 1 and auxiliary rectangular planar element 2 is irregular and the longitudinal reinforcing ribs 21-24 are severed at the transverse irregular junction between main unit 1 and auxiliary unit 2 according to a feature of this invention. The disjointable connecting structure is more fully disclosed in the aforementioned U. S. Patent application Ser. NO. 416,057.

In FIG. 4, the lateral spacing between the longitudinal reinforcing ribs 37, 37a and 38, 38a as well as between the side guides 4, 4a and the ribs 37, 37a is different from the spacing between the longitudinal ribs 21-25 and 21a-25a as shown in FIG. 3. The transverse rib 39 is formed in auxiliary planar element 2 while the transverse reinforcing rib 40 is formed integrally with the main rectangular planar element 1. Since the end portions 28a, 31 and 34 of the end projections shown in FIG. 4 are in transverse alignment, it follows that the ends 38b and 38c are disposed astride the end portion 28a. In similar fashion, the ends 37b and 37c are disposed astride the end portion 31 of the projection of unit 1 and the end 4b of the side 4a and the end 4c of the side 4 are also disposed in coincidence with the end portion 34 of one of the ribs forming a part of the irregular junction between the main and auxiliary units.

Figure 5:
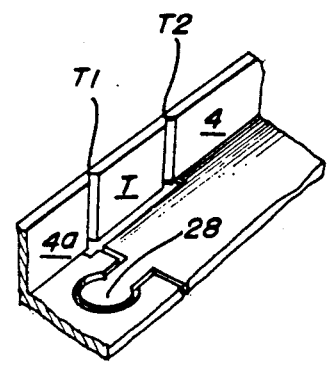
FIG. 5 is an enlarged fragmentary perspective view of a frangible connecting element disjointably connecting main and auxiliary elements as viewed from the inside.
Figure 6:
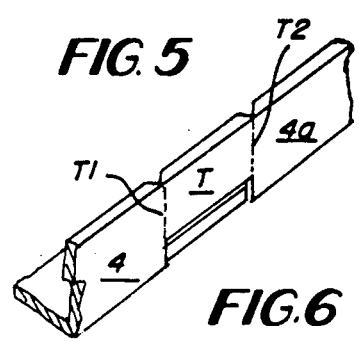
FIG. 6 is a view of the structure shown in FIG. 5 as viewed from the outside of that structure.

Thus with the structures shown in FIGS. 3 and 4, the main and auxiliary units are adequately reinforced and are adapted for accommodating easy disassembly of the auxiliary unit 2 from the main unit 1 if desired. Such disassembly is accomplished by simply rupturing the junction between the clips 13, 14 and 15 and the units 1 and 2. Once this junction is severed, the auxiliary unit may be reassembled with the main unit and stacked with another main unit. As an alternative to the generally U-shaped clips 13, 14 and 15, the tab T as shown in FIGS. 5 and 6 may be employed. This tab is disjointable along the frangible tear lines T1 and T2 so as to disconnect the main and auxiliary planar units. Once this junction is severed, the auxiliary unit may be reassembled with the main unit but must necessarily then be used when supported on a flat surface. The structure and function of tab T are fully disclosed in U.S. patent application Ser. No. 416,057.

According to one feature of this invention, the clip C having internal ribs R and R1 can be used to connect and disconnect the adjacent end of the side and intermediate guides 4, 4a, 5, 5a, 6 and 6a. When assembled the ribs R and R1 are disposed in grooves such as G and G1 and the latches L1 and L2 engage the lower edges of the side and intermediate guides so as securely to lock the units 1 and 2 together. This connection can be removed if desired in order to disconnect the units 1 and 2 by simply removing the clips C. Also the disassembled units may be reconnected by reassembling the two units and by then applying the clips C as indicated in FIG. la. The units may then be stacked in spaced relation one atop another if desired. Also the clip C like the clips 13-15 can be molded simultaneously with the molding of units 1 and 2.

According to this invention, a composite organizer unit is provided which may be used when the main and auxiliary units are interconnected by frangible means or by disjointable reconnectable means and may be used in a tier with one unit stacked in spaced relation above a lower unit. Furthermore, the reinforcing under structure formed according to this invention makes possible the production of a sturdy mechanically suitable structure of less weight due to the incorporation of the reinforcing under structure and such under structure is accommodated without interference with the operability of the main and auxiliary units.

I claim:

1. A composite structure for supporting and displaying articles and comprising a main support unit including a main rectangular planar element having front, rear and opposed side edges, an auxiliary support unit including an auxiliary rectangular planar element having front, rear and opposed side edges, one edge of said auxiliary rectangular planar element being of a configuration which is irregular and complementary to one irregular edge of said main rectangular planar element to define a disjointable irregular junction between said units, a reinforcing under structure integrally formed with the lower surfaces of said units and including a plurality of spaced apart longitudinal reinforcing ribs, each of said longitudinal ribs being severed at said disjointable irregular junction to accommodate separation of said units.

2. A composite structure according to claim 1 wherein said reinforcing under structure includes a plurality of spaced apart transverse reinforcing ribs integral with said longitudinal reinforcing ribs.

3. A composite structure according to claim 1 wherein a plurality of side and intermediate longitudinal guides are integrally formed with the top surface of said main planar element and are aligned with corresponding longitudinal guides integrally formed with the top surface of said auxiliary planar element to define a plurality of channels for receiving rows of displayed articles, the side guides which are disposed along the side edges of said main and of said auxiliary planar elements being arranged to project below said main and said auxiliary planar elements to form integral supplementary parts of said reinforcing under structure and removable connecting means arranged to interconnect adjacent ends of at least some of said longitudinal guides forming parts of said main and of said auxiliary support units.

4. A composite structure according to claim 3 wherein said removable connecting means adjoins adjacent ends of at least some of said longitudinal guides by frangible connecting means.

5. A composite structure according to claim 3 wherein said removable connecting means is specially adapted for reconnecting adjacent ends of said longitudinal side guides.

6. A composite structure according to claim 5 wherein said removable connecting means comprises a generally U-shaped clip arranged to overlie the junctions between adjacent ends of said longitudinal guides.

7. A composite structure according to claim 6, wherein projecting rib means is formed on the inner surface of said clips and arranged to seat in cooperating groove means formed in adjacent ends of said longitudinal guides adjacent the junction between said units.

8. A composite structure according to claim 7 wherein latch means formed on the prongs of said clips engages the lower edges of said longitudinal guides to aid in removably securing said clips on said guides.

* * * * *